Patented Nov. 25, 1930

1,782,493

UNITED STATES PATENT OFFICE

JOHANNES van LOON, OF DEVENTER, NETHERLANDS

ACTIVE CARBON AND PROCESS FOR MAKING SAME

No Drawing. Application filed February 15, 1927, Serial No. 168,468, and in the Netherlands March 5, 1926.

The present invention relates to the manufacture of active carbon or decolorizing carbon by special grinding. The use of active or decolorizing carbons made by chemical and combustion processes is well known as well as the processes for their preparation. All the processes for the manufacture of active carbons known up to the present time are generally based on a fine diminution of carbon as well as especially on a transformation of the surface of the carbon parts induced by the action of acids, alkalies or metal chlorides, generally at an elevated temperature. It was formerly thought necessary to activation that the surface of the carbon parts or particles should be etched or corroded by chemicals or heat in order to produce activation. It was at no time conceived that active carbon, as it is known today, could be produced only by grinding and without the use of chemical action, and all the theories advanced in regard to the best activation of carbon pointed to the desirability of methods of preparation other than by grinding. The production of active or decolorizing carbon by grinding according to my invention represents a new and unexpected result.

During the World War numerous secret processes were devised for activating carbons, especially carbons used for absorbing gases. After the end of the war many of these processes were published but all of them appear to be based on the use of chemicals to chemically react with the carbon particles or coating of inactive carbonaceous matter covering the active particles themselves. The chemical action was also accomplished by regulated combustion at temperatures higher than atmospheric, either with or without the presence of activating solids or gases.

From my discovery a very surprising fact appears that a very highly active carbon can be manufactured if carbon is ground, preferably by wet grinding, i. e. by grinding carbon in the presence of a liquid. Besides the desirable degree of fineness, the absorptive properties of the active carbon obtained in accordance with my process highly exceed those of the products manufactured according to present known processes, the carbon produced in accordance with my process being 200 and more per cent more active than the carbon made in accordance with the known processes referred to above. In order to produce this activation by grinding it is necessary that the grinding be continued until the size of the particles are reduced to from 2 to 5 $\mu$ or less. Of course, a certain degree of activation might in certain instances, with certain materials, be attained when the size of the particles is somewhat greater, for example 8 or 9 $\mu$, but it is found more desirable to obtain the greatest activities to reduce the size of the particles to below or about 2 $\mu$. The grinding or diminution of the size of the carbon particles is discontinued before objectionable quantities of material of colloidal fineness are produced, as otherwise the product will not be readily usable for decolorizing operations which involve the separation of the decolorizing agent from the liquid to be decolorized. This separation is usually accomplished by filtration which operation would not separate colloidal particles.

As starting materials to be ground, ordinary wood charcoal, linden-wood coal, anthracite coal, bituminous coal, used and unused active or decolorizing carbons such as Eponite may be used. As the wetting agent for wetting the carbon during grindings water, alcohol, benzol or a mixture thereof may be employed. It is to be understood that other liquids may be employed which are capable of being separated from the carbon either by volatilization or by extraction after the grinding action has been accomplished.

Instead of carrying out the process at normal room temperature it may be advantageous to work at an elevated temperature and it has been found useful to grind the respective material of coal even at temperatures over 100 degrees centigrade i. e. under pressure. This manner of working accelerates the process of effectively opening the surface of the coal.

The economic value of the present invention immediately manifests itself as, by it, one is now enabled to obtain very highly active carbon in a very simple way from practically any carbon or carbon containing material.

In order that the invention may be fully understood, several illustrative examples are given below. However, these are given merely for illustrative purposes and I do not thereby intend to limit myself to these details, as obviously the details of grinding may be varied without departing from my invention and a mixture of two or more liquids may be used or the liquids may be excluded entirely with the consequent diminution of the generally high activation attained when they are used.

Example I

In a porcelain barrel 1 kg. of some decolorizing carbon e. g. Eponite is ground with 1½ liters of water and 1½ kg. of steel balls of similar and different sizes during about 15 hours at from 10 to 20 rotations per minute. The barrel is preferably rotated on a horizontal axis, as a ball mill, and should be preferably of such size as to be about half full when all the balls and material are inserted for the grinding operation. After grinding the carbon is released from the liquid by exhausting in a well known way, washed out and dried.

The active carbon obtained in accordance with this example possesses an activity which is about 200% greater than the starting material. The degree of fineness to which the grinding should be conducted should always be as explained above, which will result if the conditions of this example are fulfilled.

Example II

According to this example it may be proceeded as follows: A part of finely pulverized lime-wood coal, about two to three parts of water and two parts of steel balls of different size are mixed together and heated up to from 150–180 degrees centigrade in a so-called high-pressure autoclave which is rotated about 25 to 30 times a minute. The period of heating may be about 10 hours. After cooling and working up the contents of the autoclave according to the directions given in Example I a finely powderous mass is obtained which exercises a good activity while the starting-material is comparatively almost inactive.

The simultaneous or consecutive employment of several liquids, the selection of these liquids being determined by the character of the carbon to be ground, has technically this great advantage that during the grinding of the carbon an extraction takes place at the same time, leaving the coal active in a pure state free from tarry matters or the like. By this extraction process, which may occur also when the liquid agents are used alone, depending upon their character, tarry and empyreumatic materials as well as soluble organic and inorganic materials are removed, thereby uncovering and producing additional active surfaces. In this way, even starting from inferior coal, one can obtain a very highly active carbon.

The grinding operation may be conducted at room temperature though the process is accelerated and the activity of the carbon is sometimes increased when the grinding is done above room temperature. The temperature of grinding should be such one as to retain any material that may be liquid at normal temperature in the liquid state. It may be desirable to operate at temperatures above the boiling point of the liquid used at atmospheric pressure. When operating under pressures above atmospheric pressure the rotatory grinding drum or barrel autoclave must be closed sufficiently tightly to retain this pressure i. e. the temperature and when the liquids used are volatile at the temperatures employed the barrel or drums should also be tightly closed to prevent loss by evaporation or means provided to constantly add fresh liquid to make up for the evaporation occurring during grinding.

The term "carbon" in the following claims includes the specific materials recited above and is used in the further sense to include elemental carbon in the pure or impure state, and active or decolorizing carbons which will have their properties enhanced by treatment in accordance with the present invention. By the term "active" used in connection with carbon in the claims I intend and include thereby active as well as decolorizing properties.

Having described my invention what I claim is:

1. The process of manufacturing decolorizing carbon which comprises grinding carbon to a size not substantially greater than 2 to 9$\mu$ in the presence of a liquid medium, but discontinuing the reduction in size at a point where the product is substantially non-colloidal, and separating the carbon and liquid medium after grinding.

2. The process of manufacturing decolorizing carbon which comprises grinding carbon to a size not substantially greater than 2 to 9$\mu$ in the presence of a liquid medium above the boiling point of the liquid medium at atmospheric pressure, but discontinuing the reduction in size at a point where the product is substantially non-colloidal, and separating the carbon and liquid medium.

3. An adsorptive agent which consists of carbon which has been caused to acquire adsorptive properties by grinding to a size of about 2 to 9$\mu$.

4. Decolorizing carbon having particle sizes from 2 to 9$\mu$.

5. Adsorptive carbon having particle sizes of approximately 2 to 9$\mu$.

In testimony whereof I affix my signature.

JOHANNES van LOON.